United States Patent
de Bock et al.

(10) Patent No.: US 9,353,948 B2
(45) Date of Patent: May 31, 2016

(54) GAS TURBINE COMBUSTOR INCLUDING A COATING HAVING REFLECTIVE CHARACTERISTICS FOR RADIATION HEAT AND METHOD FOR IMPROVED COMBUSTOR TEMPERATURE UNIFORMITY

(75) Inventors: Hendrik Pieter Jacobus de Bock, Clifton Park, NY (US); Mark Allan Hadley, Greer, SC (US); Joel Meier Haynes, Schenectady, NY (US); Brian Gene Brzek, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1115 days.

(21) Appl. No.: 13/334,173

(22) Filed: Dec. 22, 2011

(65) Prior Publication Data

US 2013/0160457 A1 Jun. 27, 2013

(51) Int. Cl.
*F23R 3/00* (2006.01)
*F01D 5/28* (2006.01)

(52) U.S. Cl.
CPC ....... *F23R 3/002* (2013.01); *F23D 2900/00001* (2013.01); *F23R 2900/03043* (2013.01); *Y02T 50/675* (2013.01)

(58) Field of Classification Search
CPC ............ F23R 3/00; F23R 3/002; F23R 3/007; F23R 2900/00018; F23R 2900/00; F23R 2900/03043; F01D 5/288; F05D 2230/30; F05D 2230/31; F05D 2230/90; F05D 2300/611; F05D 2300/6111

USPC ........ 60/752–760; 427/8, 160, 162, 256, 265, 427/287

See application file for complete search history.

(56) References Cited

U.S. PATENT DOCUMENTS

| | | | | |
|---|---|---|---|---|
| 3,354,652 A | * | 11/1967 | Novotny et al. | 60/260 |
| 4,567,730 A | | 2/1986 | Scott | |
| 4,942,732 A | * | 7/1990 | Priceman | 60/766 |
| 5,580,172 A | * | 12/1996 | Bhardwaj | G01K 11/12 374/137 |
| 5,851,679 A | * | 12/1998 | Stowell et al. | 428/472 |
| 6,210,791 B1 | * | 4/2001 | Skoog et al. | 428/325 |
| 6,227,451 B1 | | 5/2001 | Caruso | |

(Continued)

FOREIGN PATENT DOCUMENTS

| | | |
|---|---|---|
| EP | 0139396 A1 | 5/1985 |
| EP | 1647611 A2 | 4/2006 |

(Continued)

OTHER PUBLICATIONS

Goeckner et al., "Radiative Heat Transfer Augmentation of Natural Gas Flames in Radiant Tube Burners with Porous Ceramic Inserts", Experimental Thermal and Fluid Science, vol. 5, Issue 6, pp. 848-860, Nov. 1992.

(Continued)

*Primary Examiner* — William H Rodriguez
(74) *Attorney, Agent, or Firm* — Pabrita K. Chakrabarti

(57) ABSTRACT

A combustor and a method for reducing a temperature gradient of a combustor component are provided. The combustor includes a coating applied to at least a portion thereof with the coating serving to alter the emissivity of the at least a portion to which it is applied. The method includes applying a coating on at least one of a combustor liner and a flow sleeve, wherein the coating alters the emissivity exhibited where applied.

13 Claims, 4 Drawing Sheets

(56) References Cited

U.S. PATENT DOCUMENTS

| | | | |
|---|---|---|---|
| 6,393,828 B1* | 5/2002 | Zhao et al. | 60/39.37 |
| 6,767,659 B1* | 7/2004 | Campbell | 428/701 |
| 6,887,587 B2 | 5/2005 | Allen et al. | |
| 2003/0008170 A1* | 1/2003 | Allen et al. | 428/678 |
| 2005/0153065 A1* | 7/2005 | Lenkner et al. | 427/162 |
| 2005/0282032 A1 | 12/2005 | Gupta et al. | |
| 2009/0169898 A1 | 7/2009 | Ivkovich et al. | |

FOREIGN PATENT DOCUMENTS

| | | |
|---|---|---|
| EP | 1927677 A1 | 6/2008 |
| GB | 2147406 A | 5/1985 |
| RU | 2250414 C1 | 4/2005 |
| WO | 2006006995 A1 | 1/2006 |

OTHER PUBLICATIONS

Arana, "The Effect of TBC Utilization in the Design of Robust Aircraft Combustors", AGARD SMP Meeting on Thermal Barrier Coatings, Oct. 15-16, 1997, Aalborg, Denmark.

Siegel et al., "Analysis of Thermal Radiation Effects on Temperatures in Turbine Engine Thermal Barrier Coatings", Materials Science and Engineering: A, vol. 245, Issue 2, pp. 150-159, May 1, 1998.

Sedalor, "Heat Transfer and Flow Characteristics Study in a Low Emission Annular Combustor", Virginia Polytechnic Institute and State University, pp. 1-70, Dec. 7, 2009, Blacksburg, Virginia.

European Search Report and Opinion issued in connection with corresponding EP Application No. 12196483.7 on Apr. 2, 2013.

* cited by examiner

US 9,353,948 B2

GAS TURBINE COMBUSTOR INCLUDING A COATING HAVING REFLECTIVE CHARACTERISTICS FOR RADIATION HEAT AND METHOD FOR IMPROVED COMBUSTOR TEMPERATURE UNIFORMITY

TECHNICAL FIELD

The present invention relates generally to combustors, and more specifically to combustor temperature uniformity.

BACKGROUND INFORMATION

Gas turbines, also called combustion turbines, are used to power aircraft, trains, ships, tanks, and generators. Such turbines have a rotating compressor coupled upstream from a turbine. A combustion chamber, or combustor, is positioned between the compressor and the turbine. Energy is added to a gas stream passing through the combustor, in which fuel is mixed with air and ignited.

Combustion of the fuel increases the temperature within the combustor. Often, combustor designers design combustors, including the materials used to form portions of the combustors, to withstand a specific increase in temperature to a maximum temperature. Further, combustor designers often design combustors with a specific maximum temperature in mind, which is typically limited by the material capability.

One problem found in conventional combustors is that the mere operation of the combustors causes thermal degradation of the components. Further, any upward deviations to the maximum temperature may cause accelerated thermal degradation of combustor components. Additionally, hot spots can occur within the combustor. Hot spots or thermal gradients can cause significant thermal stresses in the combustion liner as common materials expand when heated.

With some of these concerns in mind, a combustor with improved thermal resistance and with a reduced temperature gradient would be welcome in the art.

SUMMARY OF THE INVENTION

In some embodiments, a combustor is provided having a coating applied to at least a portion thereof. The coating serves to alter the emissivity of the portion to which it is applied.

In some embodiments, a method for reducing a temperature gradient of a component to be cooled by a coolant air pathway is provided. The method includes providing a combustor having a casing, a combustor liner, and a flow sleeve with an air inlet and an outlet. The method also includes applying a coating on at least one of the combustor liner and the flow sleeve, wherein the coating alters the emissivity exhibited where applied.

In some embodiments, a gas turbine is provided. The gas turbine includes a rotating compressor, a turbine, and a coolant air pathway between the rotating compressor and the turbine. The coolant air pathway includes a flow sleeve coated with a material serving to alter the emissivity of the flow sleeve.

The foregoing has outlined rather broadly the features of embodiments of the invention so that the detailed description of the invention that follows may be better understood. Additional features and advantages of the invention will be described hereinafter, which form the subject of the claims of the invention.

For a more complete understanding of the invention, and the advantages thereof, reference is now made to the following descriptions taken in conjunction with the accompanying drawings.

DETAILED DESCRIPTION OF THE INVENTION

Figure 1:
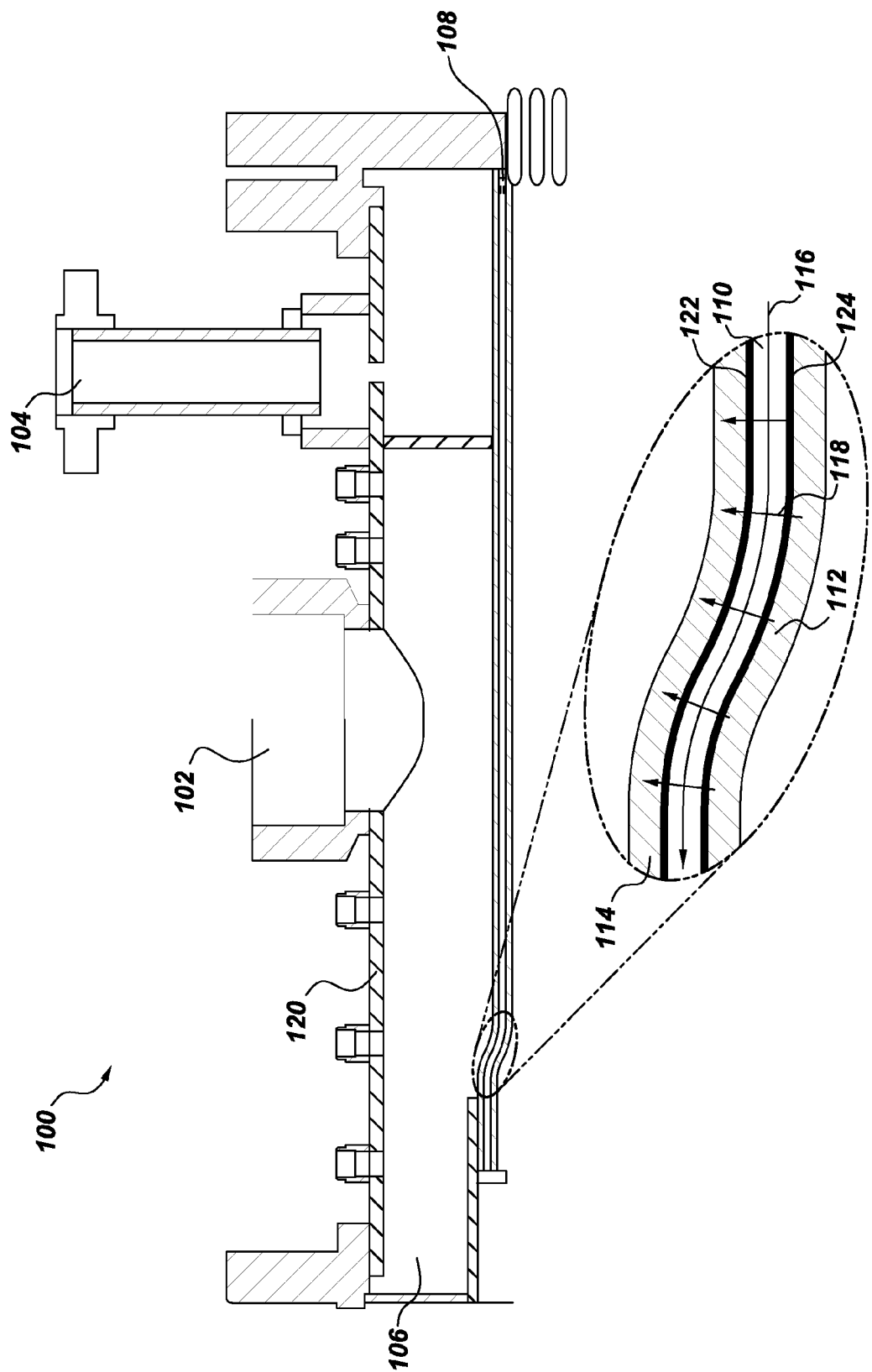
FIG. 1 is a cross-sectional view through a combustor in accordance with an embodiment of the invention.

In the following description, specific details are set forth such as specific quantities and sizes so as to provide a thorough understanding of embodiments of the invention. However, it will be obvious to those skilled in the art that the invention may be practiced without such specific details. In many cases, details concerning such considerations and the like have been omitted inasmuch as such details are not necessary to obtain a complete understanding of the invention and are within the skills of persons of ordinary skill in the relevant art. Referring to the drawings in general, it will be understood that the illustrations are for the purpose of describing a particular embodiment of the invention and are not intended to limit the invention thereto. When not explicitly defined, terms should be interpreted as adopting a meaning presently accepted by those of skill in the art.

Referring to FIG. 1, there is shown a combustor 100. The combustor may include one or more coolant inlet ducts 102, 104, a containment vessel 106, and an air pathway inlet 108. The combustor further includes a casing 120, within which is a combustor liner 112 and a flow sleeve 114.

With particular reference to the inset shown in FIG. 1, there is a coolant air pathway 110 between the combustor liner 112 and the flow sleeve 114. Cooling air 116 is received at an air inlet 108 and transmitted along the coolant air pathway 110. The cooling air 116 is intended to cool down the flow sleeve 114 and the combustor liner 112.

However, radiation and/or convection occur in a direction 118 from the combustor liner 112 toward the flow sleeve 114 and cooling air 116. The radiation/convention 118 results in increasing the temperature of the cooling air 116, and that increase continues in a direction from the air inlet to the outlet. Cooling air can flow in either direction, and the temperature of the cooling air increases in the direction of flow.

The temperature attained within the combustor 100 depends upon the velocity of the air traveling through the coolant air pathway 110, the mass flow of the air through the coolant air pathway, the emissivity of the surfaces of the combustor liner 112 and the flow sleeve 114, as well as other factors such as hot gas temperature, hot gas flow rate, hot gas flow area, and the surface characteristics of the combustor liner and the flow sleeve, for example.

One embodiment of the invention includes providing a coating 124, 122 of a material on one or more surfaces of a component of the coolant air pathway 110 such as, for example, on at least one of the combustor liner 112 and the flow sleeve 114. In one embodiment, the coated surface faces the path of cooling air. In another embodiment, the coated surface may face away from the flow path. The coating serves to alter the emissivity $\epsilon$ of the coated portions of the component or components of the coolant air pathway 110. The emissivity $\epsilon$ of a material is the relative ability of that material's surface to emit energy by radiation. The emissivity $\epsilon$ is the ratio of energy radiated by a particular material to energy radiated by a black body at the same temperature. For example, a true black body would have an emissivity $\epsilon$ of 1.0, whereas other materials will have an emissivity $\epsilon$ between 0.0 and 1.0.

Figure 2:
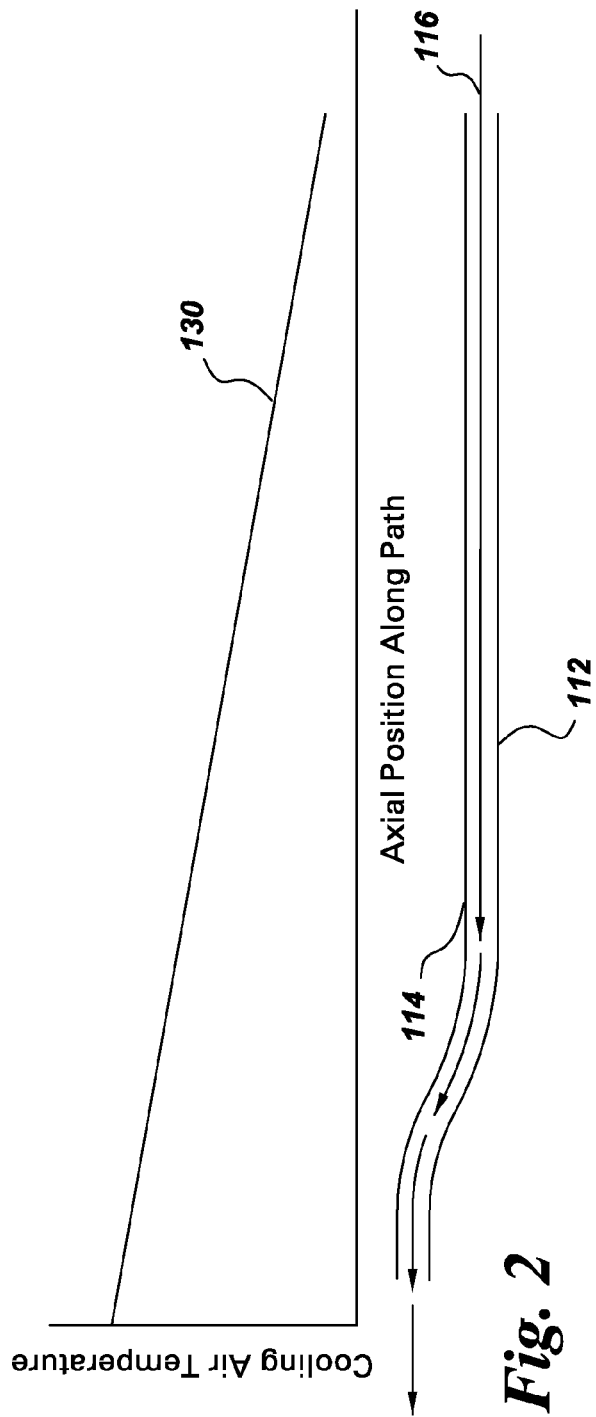
FIG. 2 is a graph of an example of an expected change in cooling air temperature along the direction of flow through the coolant air pathway when no hot spots are present.

FIG. 2 schematically illustrates the temperature 130 that the cooling air 116 is expected to exhibit as it flows along the coolant air path of the combustor. As can be seen, there is a heating of the cooling air as it moves along the path. The heating of the cooling air does not in itself does not lead to degradation combustion liner or flow sleeve. Degradation of such a component typically occurs either when the metal of the component becomes too hot, despite the presence of the cooling air, or due to thermal gradients in the component. Embodiments of the present invention may be used to control and/or contour an emissivity pattern to optimize both temperature and temperature gradients in a component. The temperature (and heat pickup) of the cooling air is useful when considering both the maximum allowed temperature and temperature gradient.

Figure 3:
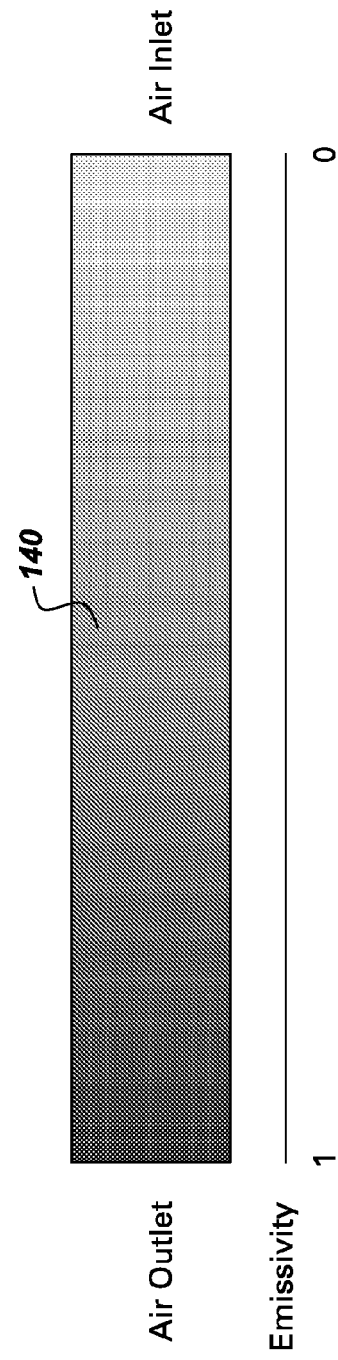
FIG. 3 illustrates a graded emissivity coating in accordance with one embodiment of the invention.

One embodiment of the invention is to provide a varied coating to the coolant air pathway 110 on at least one of the combustor liner 112 and the flow sleeve 114 (meaning on either or both of the combustor liner and the flow sleeve). FIG. 3 illustrates schematically a graded coating 140 that can be applied between the air inlet and the outlet so as to diminish the thermal gradient of the coated component between the air inlet and the outlet. As shown, the coating nearer to the air inlet is less emissive (closer to zero), while the coating nearer to the outlet is more emissive (closer to one). Alternatively, the coating 140 may not be graded, but instead may be chosen to provide an average emissivity $\epsilon$ along the entire coolant air pathway 110. Non-limiting examples of coating materials include emissivity coatings comprising anodized titanium, zirconium, chromium, cerium, other like materials, and combinations thereof. Emissivity coatings with various temperature functionalities are commercially available from sources such as Tiodize Company and Emisshield, Inc. If desired, a single coating may be used on the surface. In some embodiments, different coatings may be used to provide different emissivity properties of the surface for different locations. In the example of FIGS. 2 and 3, no hot spots are present. As discussed below, select emissivity contouring may be used for selective hot spot reduction.

Figure 4:
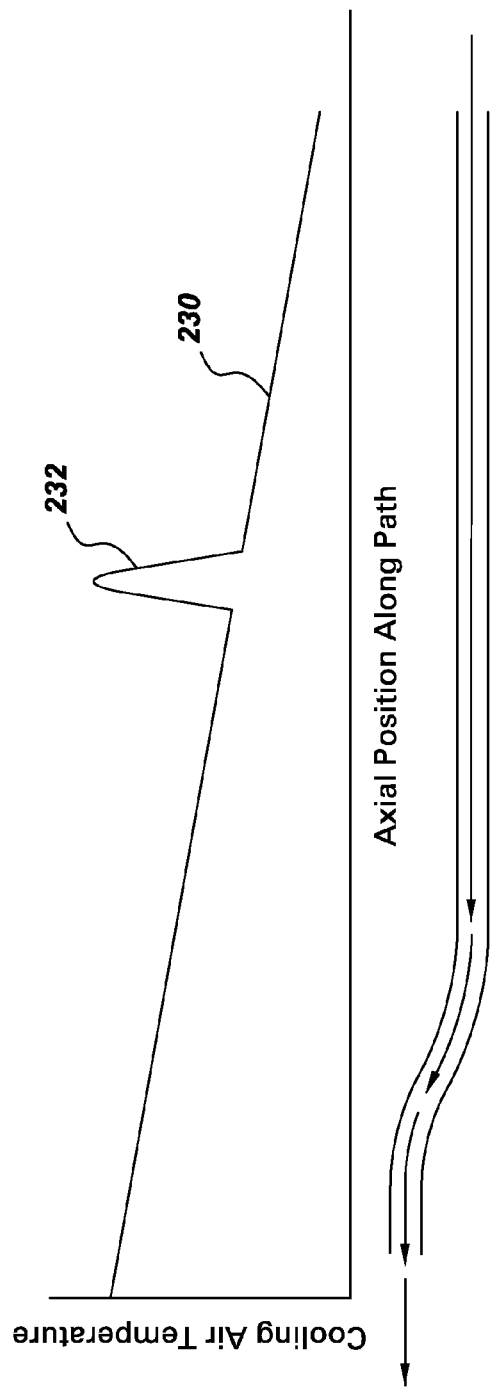
FIG. 4 is a graph of an example of an expected change in component temperature when a hot spot is present.

FIG. 4 is a graph of an example of an expected change in component temperature when a hot spot 232 is present on a component to be cooled by cooling air along the coolant air pathway 110. Although the graph 230 is shown as sloping upward in the direction of cooling air flow for purposes of example, the shape of graph 230 will depend upon various component temperature factors including those discussed above with respect to FIG. 1, for example. The hot spot causes a ripple or spike in the temperature gradient 230. In such a situation, while a graded coating such as the coating 140 (FIG. 3) would address a roughly linear temperature gradient portion of the curve 230, it would be less effective in addressing the hot spot 232. Thus, in one embodiment a linear gradient would be applied, whereas, in another embodiment a different gradient emissivity contour may be applied.

Figure 5:
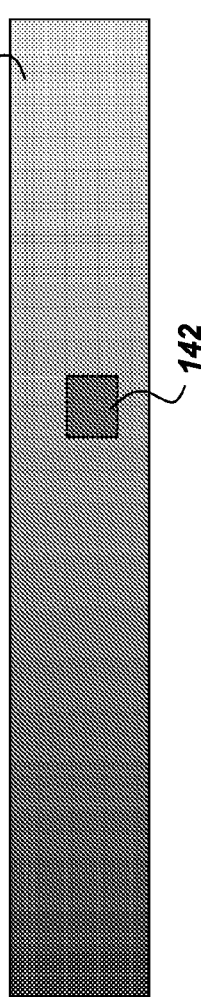
FIG. 5 illustrates an emissivity coating patterned in sections and accounting for a hot spot in a combustor flow path in accordance with one embodiment of the invention.
Figure 6:
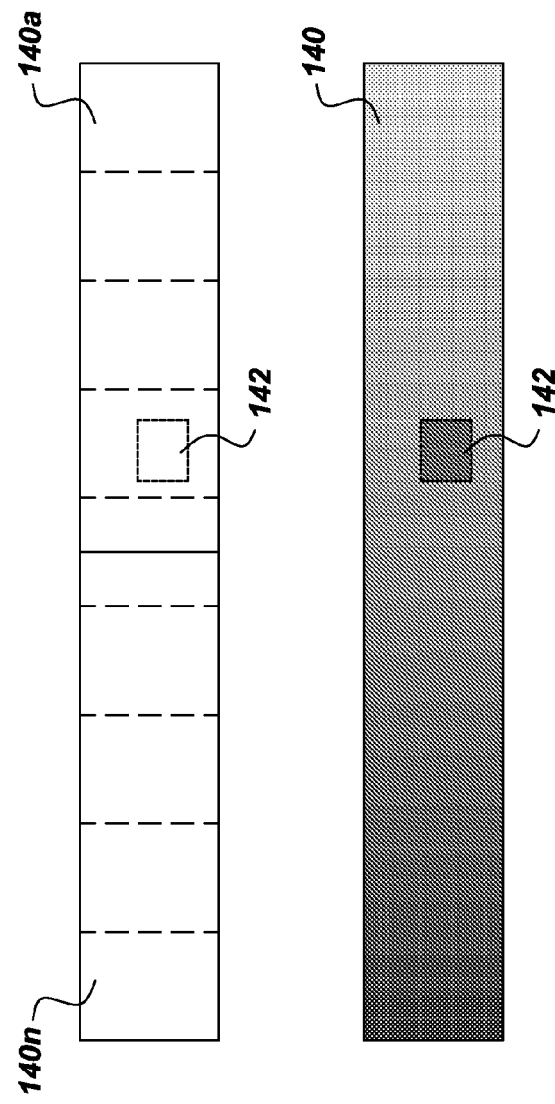
FIG. 6 illustrates a graded emissivity coating patterned to account for a hot spot in a combustor flow path in accordance with another embodiment of the invention.

In one embodiment, as shown in FIG. 5, a coating can be applied in sections 140a-140n. The sections may be graded in a direction from the air inlet to the outlet or may be specifically tailored to a particular portion of the coolant air pathway 110. For example, a coating 142 can be applied to address the hot spot 232. Alternatively, as shown in FIG. 6, a graded coating 140 can be provided along one or more components within the coolant air pathway 110, and a hot spot coating 142 can be applied in any location where a hot spot 232 has been detected.

For newly designed combustors, the expected temperature gradient may be derived from design models, experience or detailed analysis. Based on the information on where the temperature gradients are likely to occur, the designer will be able to formulate an emissivity contour coating to reduce temperature gradients in order to reduce stresses and increase the life of the part as illustrated by FIG. 7.

For combustors that have already been installed within a larger system, such as a gas turbine, ascertaining the type of pattern needed of an emissivity-altering coating may be challenging. In one embodiment, the combustor components can be painted with a thermal sensitive paint. Known thermal sensitive paints change color based upon the maximum temperature reached. After some use, the thermal sensitive paint will have changed colors, and a coating pattern can be profiled consistent with the thermal sensitive paint pattern. A computer-numerical-control (CNC) robot can be programmed to apply the coating.

Alternatively, a coating pattern can be fashioned based upon a review of the components that have failed due to thermal degradation. Thermal degradation to the point of failure points to high sustained temperatures, or hot spots, at or near the failed components. Replacement components can be coated with an emissivity-altering material to address the hot spots.

Figure 7:
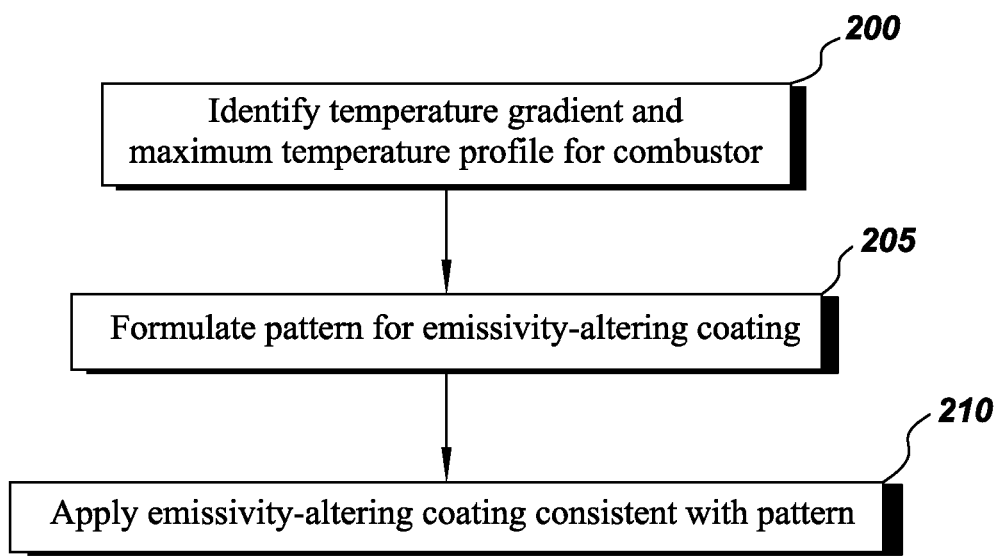
FIG. 7 illustrates steps for improving temperature uniformity along a combustor flow path in accordance with one embodiment of the invention.

With particular reference to FIG. 7, one embodiment of the invention is directed to a method for reducing a temperature gradient of a component to be cooled by cooling air along a coolant air pathway. At Step 200 a temperature gradient and a maximum temperature profile is determined for a combustor, such as combustor 100. One process for identifying a temperature gradient and maximum temperature profile is by applying a thermal sensitive paint to the combustor, operating the combustor, and ascertaining the thermal pattern in the thermal sensitive paint. Another process for identifying thermally challenged areas within the combustor is keeping track of components within the combustor that fail due to thermal degradation.

At Step 205, a pattern is determined for application of a coating designed to alter the emissivity of the component to which it is applied. Next, at Step 210, the emissivity-altering coating is applied consistent with the pattern. One process for applying the coating is through the use of a computer-numerical-control (CNC) robot programmed with the pattern.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, while embodiments have been described in terms that may initially connote singularity, it should be appreciated that multiple components may be utilized. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A combustor comprising a flow sleeve and a coating applied in a pre-determined pattern to at least a portion of the flow sleeve, said coating serving to alter the emissivity of the at least a portion to which it is applied so as to reduce a temperature gradient of the flow sleeve and result in the flow sleeve exhibiting a lower emissivity at an air inlet and a progressively higher emissivity moving in a direction from the air inlet to an air outlet, wherein the pre-determined pattern comprises a pattern profiled consistent with a thermal pattern in a known thermal sensitive paint applied to at least a second component of the combustor.

2. The combustor of claim 1, wherein during use of the combustor the coating serves to increase the maximum material temperature capability.

3. The combustor of claim 1, wherein the coating is graded to diminish the temperature gradient.

4. The combustor of claim 3, wherein the coating is graded in a linear gradation of emissivity from the air inlet to the outlet.

5. The combustor of claim 3, wherein the coating is graded in a non-linear gradation of emissivity from the air inlet to the outlet.

6. The combustor of claim 1, wherein the pattern addresses a hot spot.

7. The combustor of claim 1, further comprising a combustor liner comprising an additional coating applied to the combustor liner on a surface facing a coolant air pathway and serving to alter the emissivity of the combustor liner.

8. The combustor of claim 1, wherein the coating comprises anodized titanium, zirconium, chromium, cerium, or combinations thereof.

9. The gas turbine of claim 1, wherein the pre-determined pattern further comprises a pattern profiled consistent with a thermal pattern in a known thermal sensitive paint applied to a plurality of components within the combustor.

10. A method for reducing a temperature gradient of a component of a combustor comprising a casing, a combustor liner, and a flow sleeve, the method comprising:

applying a coating on at least one of the combustor liner and the flow sleeve, wherein the coating alters the emissivity exhibited where applied, wherein said applying a coating comprises applying the coating in a pre-determined pattern on the flow sleeve, wherein the coating alters the emissivity exhibited by the flow sleeve so as to reduce a temperature gradient of the flow sleeve, and wherein the pattern results in the flow sleeve exhibiting a lower emissivity at an air inlet and a progressively higher emissivity moving in a direction from the air inlet to an air outlet, wherein the pre-determined pattern comprises a pattern profiled consistent with a thermal pattern in a known thermal sensitive paint applied to a plurality of components within the combustor.

11. The method of claim 10, wherein the pre-determined pattern addresses a hot spot found in the flow sleeve.

12. A gas turbine, comprising:
a rotating compressor;
a turbine; and
a coolant air pathway between the rotating compressor and the turbine, comprising a flow sleeve coated with a coating applied in a pre-determined pattern and serving to alter the emissivity of the flow sleeve so as to reduce a temperature gradient of the flow sleeve and result in the flow sleeve exhibiting a lower emissivity at an air inlet and a progressively higher emissivity moving in a direction from the air inlet to an air outlet, wherein the pre-determined pattern comprises a pattern profiled consistent with a thermal pattern in a known thermal sensitive paint applied to a plurality of components within the combustor.

13. The gas turbine of claim 12, further comprising a combustor liner comprising an additional coating applied to the combustor liner on a surface facing the coolant air pathway and serving to alter the emissivity of the combustor liner.

* * * * *